United States Patent
Ishiyama et al.

(10) Patent No.: US 7,391,682 B2
(45) Date of Patent: Jun. 24, 2008

(54) OPTICAL DISK SYSTEM WITH IMPROVED SIGNAL REGULATION CAPABILITY

(75) Inventors: Yoshiyuki Ishiyama, Kanagawa-ken (JP); Toshihiro Yamashiro, Kanagawa-ken (JP); Yutaka Shio, Tottori-ken (JP); Yasuhide Konishi, Tottori-ken (JP)

(73) Assignee: Ricoh Company, Ltd., Yokohama (JP)

( * ) Notice: Subject to any disclaimer, the term of this patent is extended or adjusted under 35 U.S.C. 154(b) by 712 days.

(21) Appl. No.: 10/833,171

(22) Filed: Apr. 28, 2004

(65) Prior Publication Data

US 2004/0228224 A1  Nov. 18, 2004

(30) Foreign Application Priority Data

May 12, 2003  (JP)  ............................. 2003-133132

(51) Int. Cl.
    *G11B 7/00*  (2006.01)
(52) U.S. Cl. ................ 369/44.29; 369/53.28; 369/44.28
(58) Field of Classification Search ....................... None
    See application file for complete search history.

(56) References Cited

U.S. PATENT DOCUMENTS 5,138,594 A * 8/1992 Fennema et al. ......... 369/44.26

FOREIGN PATENT DOCUMENTS

| JP | 08-124187 | 5/1996 |
|----|-----------|--------|
| JP | A-10-162383 | 6/1998 |
| JP | A-2001-250250 | 9/2001 |
| JP | 2002-269775 | 9/2002 |

* cited by examiner

*Primary Examiner*—William Korzuch
*Assistant Examiner*—Jorge L. Ortiz-Criado
(74) *Attorney, Agent, or Firm*—Dickstein Shapiro LLP

(57) ABSTRACT

A system, method, computer program and apparatus for providing regulating signals for regulating the position of an objective lens relative to a track on a disk. The regulating signals are obtained in response to an access request specifying an access target region on the disk. The tracks of a disc are divided into a plurality of zones, each zone having associated signal regulation information. In response to an access request, the signal regulation information for the zone containing the access target region is used to regulate the position of the objective lens.

39 Claims, 12 Drawing Sheets

OPTICAL DISK SYSTEM WITH IMPROVED SIGNAL REGULATION CAPABILITY

FIELD OF THE INVENTION

This patent specification relates generally to an optical disc system, and more particularly, to an optical disc apparatus with improved signal regulation capabilities, a method of operation, a computer program product and a program storage device, in which the signals containing information on the position of an objective lens in the tracking direction is acquired accurately and the access to the optical discs can be implemented with high precision.

This document claims priority and contains subject matter related to Japanese Patent Application No. 2003-133132, filed with the Japanese Patent Office on May 12, 2003, the entire contents of which are hereby incorporated by reference.

BACKGROUND

Along with recent improvements in overall capabilities of personal computers, it has become feasible for the personal computer to process AV (audio-visual) information such as music and movie images, for example.

Since the data volume of AV information is considerably large, optical recording media have been attracting much attention as a viable means for storing such information data, as exemplified by CD (compact disc) and DVD (digital versatile disc) which are capable of recording the data about seven times as large as CD. Also, optical disc systems with lowering costs have been in wide spread use as the apparatuses accessible to those recording media.

An optical recording medium is formed in general with at least a recording surface provided thereon with tracks (or pregrooves) formed continuously in the shape of a spiral or concentric circle.

In addition, two regions are formed on the recording surface of the medium, respectively called mark (pit) and space regions each having light reflectivity different with each other, such that information data is recorded by the combination of these two regions each having suitable length and arrangement on the recording surface.

An optical disc apparatus is configured in general to perform record or erase of information data by a light spot incident on the surface of the recording medium, and data readout by a light beam reflected back (return beam) from the surface of the medium.

In order to carry out these steps the optical disc apparatus incorporates an optical pickup unit for emanating laser light beams and for receiving light beams reflected back from the surface of the medium.

The optical pickup unit includes several components such as an objective, an optics system for guiding laser beams emanated from a light source to the surface of the recording medium and return beams to a predetermined receiving location, and a light detecting element placed at the receiving location.

The detecting element is adapted to output not only readout information of the data recorded on the recording surface but also the signals containing the information (including servo-information) necessary for controlling the position of the optical pickup unit itself and the objective (or objective lens).

In order for information data to be recorded at proper locations on the media surface, and for the data recorded at specified locations on the surface to be readout, light spots have to be formed precisely at aiming points, and the points have to be detected precisely. It is important therefore to properly detect the points of the light spots on the recording surface, in which various methods for achieving the detection have been disclosed utilizing return beams from the surface of the recording medium.

In general, as the signal noted earlier which contains information regarding the point for forming the light spots in the direction perpendicular to recording tracks (which is hereinafter referred to as "tracking direction") and track-error signals are utilized.

In the differential push-pull method (DPP method), for example, the light beams emanated from light source are divided into one main beam and two sub-beams. These light beams are then guided to be incident on recording media surface such that the sub-beams (SP2 and SP3) are each shifted by one-half track pitch (Tp/2) in the tracking direction Dtr with respect to the main beam (SP1) as shown in FIG. 10.

Return beams of the main and substrate-beams are then detected by three split-detectors respectively to output push-pull signals. Subsequently, track-error signals are obtained from the difference between the sum of sub-beam push-pull signals (SP2 and SP3) and the main beam push-pull signals.

Based on the track-error signals thus detected, servo-control in optical disc system is carried out so light spots are formed at the proper location on the media surface.

In addition, a variety of methods and apparatuses have been proposed for detecting the location of the light spots with high precision (Japanese Laid-Open Patent Applications No. 10-162383 and 2001-250250, for example).

The optical discs have been supplied in recent years by an increasing number of manufacturers along with rapid increase of users.

Along with this trend, however, the quality of optical discs supplied to general users has become an issue, in that some of the discs supplied in practice are of low quality with uneven track pitch for example, or sub-standard quality with a large fluctuation in track pitch depending on the type of disc.

Since signal characteristics of track-error signals fluctuate considerably for the discs of low or sub-standard quality, a possibility that light spots cannot be formed precisely at aiming points even after using apparatuses having high precision recording capabilities (as disclosed in the abovementioned '383 and '250 applications) is encountered.

In such case, users may not be aware of the difficulty in carrying out proper data recording, which is caused by low quality discs purchased previously. It is desirable therefore to provide an optical disc apparatus capable of accessing information, which are low in quality to a certain extent, or of sub-standard quality.

SUMMARY

Accordingly, it is an object of the present invention to provide a signal regulating method for acquiring signals containing information on the accurate position of an objective lens in the direction of recording tracks, and a position control method for controlling the position of the objective lens in the direction of recording tracks with a high precision.

It is another object of the present invention to provide a computer product and a program storage device for the product for acquiring the signals containing information on the accurate position of objective lens in the direction of recording tracks.

It is still another object of the present invention to provide an optical disc system capable of having accurate access to optical discs.

The following description is a synopsis of only selected features and attributes of the present invention. A more complete description thereof is found below in the "Description of the Preferred Embodiments"

To achieve the foregoing and other objects, and to overcome the shortcomings discussed above, a signal regulating method is provided for regulating signals containing information regarding the position of an objective lens in the tracking direction perpendicular to the tangential direction with respect to a track formed on an optical recording disc in the shape of a spiral or concentric circle, which is characterized by including at least the step of regulating the signals corresponding to a regulating zone including the access target region out of a plurality of regulating zones formed by dividing a plurality of said track utilizing regulation information acquired previously, in response to an access request specifying an access target region on the optical recording disc.

The regulation information includes at least one of amplitude regulation information for regulating amplitude and track balance regulation information for regulating track balance of track-error signals.

According to another aspect, a position control method is provided for controlling the position of an objective lens in the tracking direction. This position control method is adapted to control the position of an objective lens in the tracking direction perpendicular to the tangential direction with respect to the track formed on the optical recording disc.

According to still another aspect, the steps included in the above-mentioned methods are implemented with a computer program product for use with a control computer in an optical disk system configured to have access to an optical recording disc, comprising a computer usable medium having computer readable program code means embodied in the medium for causing these steps, in which the computer readable program code means includes means for acquiring a target region for the access in response to an access request onto the optical recording disc, and means for regulating signals corresponding to the regulating zone including the target region to be regulated out of a plurality of regulating zones formed by dividing a plurality of the track utilizing regulation information acquired previously.

The regulation information includes at least one of amplitude regulation information for regulating amplitude and track balance regulation information for regulating track balance of track-error signals.

According to another aspect, also described herein is a program storage device readable by a machine, tangibly embodying a program of instructions executable by the machine to perform method steps above-mentioned.

According to another aspect, an optical disc system is provided, which is configured to have access to an optical recording disc, including a regulating unit for regulating signals containing information regarding the position of the objective lens an optical pickup unit for illuminating light beams onto a recording surface of the recording disc and to receive further light beams reflected back from the recording surface, and a process unit adapted to implement the access utilizing signals output from the optical pickup unit.

The optical disc system additionally includes a memory for storing the regulation information and a storage unit for storing the regulation information in the memory.

The present disclosure, features, and advantages thereof will be more readily apparent from the following detailed description and appended claims when taken with drawings.

DESCRIPTION OF THE PREFERRED EMBODIMENTS

Figure 1:
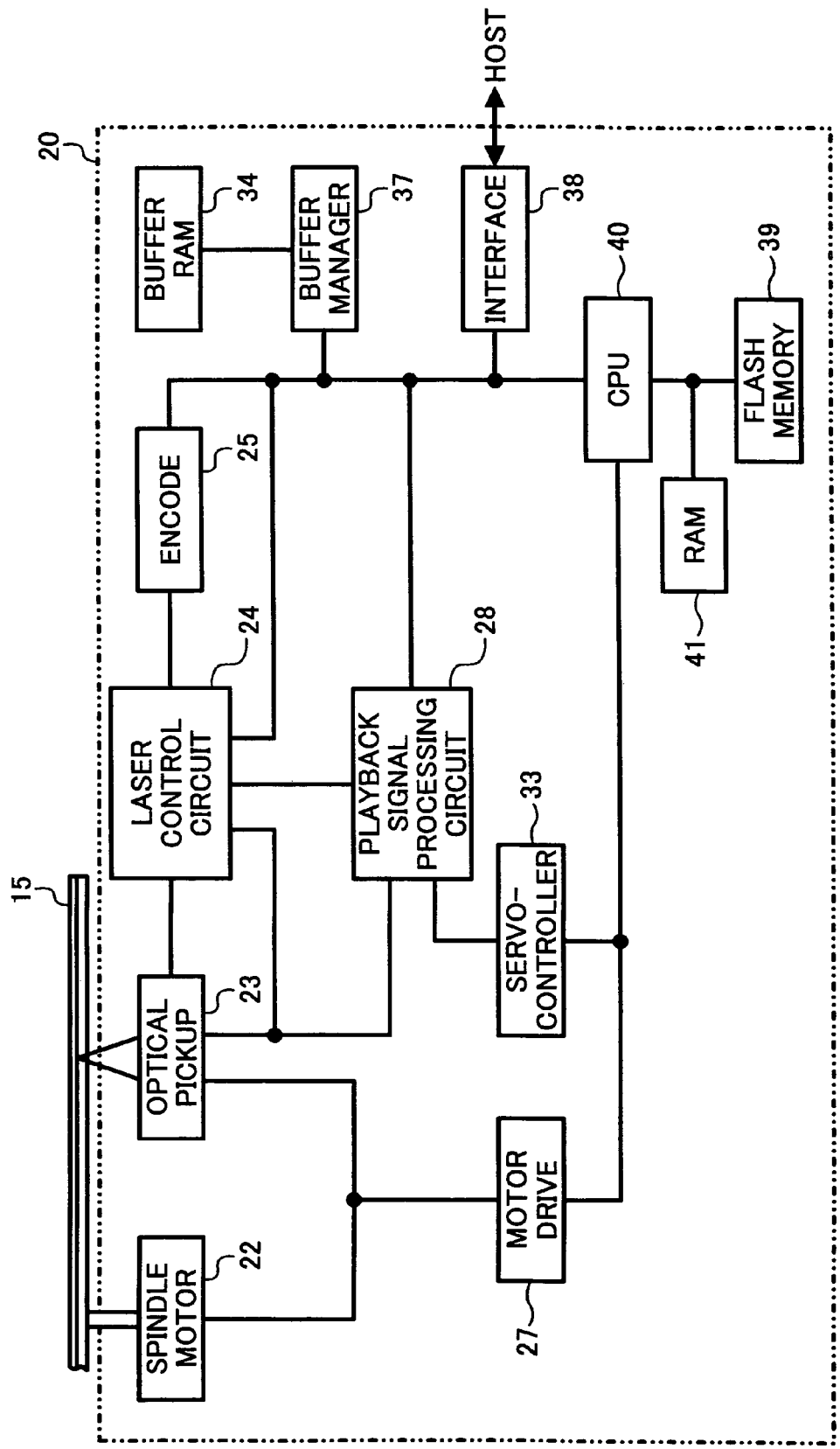
FIG. 1 is a diagrammatical block diagram illustrating an optical disc system according to one embodiment disclosed herein.

In the detailed description which follows, specific embodiments of the method and apparatus are described, which are particularly useful for regulating and acquiring accurate position signals of light beam spots and optics units used in optical disc systems. It is understood, however, the present disclosure is not limited to these embodiments. For example, the method of regulating and acquiring accurate position signals disclosed herein may also be adaptable to any form of information record and readout. Other embodiments will be apparent to those skilled in the art upon reading the following description.

A signal regulating method is disclosed herein for regulating signals containing information regarding the position of an objective lens in the tracking direction perpendicular to the tangential direction with respect to a track formed on an optical recording disc in the shape of spiral or concentric circle, which is characterized by including at least the step of regulating the signals corresponding to a regulating zone including the access target region to be regulated out of a plurality of regulating zones formed by dividing virtually a plurality of said track utilizing regulation information acquired previously, in response to an access request specifying an access target region on the optical recording disc.

It may be added that the noted information regarding the position is not limited to only "positional information" itself but also includes several pieces of information such as, for example, ones that may vary along with the change in the position, others that can be converted into positional values or be related to deviation from a predetermined, standard position.

Accordingly, in response to an access request specifying an access target region on the surface of optical recording disc provided thereon with a track in a shape of a spiral or concentric circle, the signals containing information regarding the position of the objective lens in the tracking direction can be regulated utilizing regulation information acquired previously corresponding to a regulating zone including the access target region to be regulated out of a plurality of regulating zones formed by dividing a plurality of the tracks.

This signal regulation can be carried out even for discs having uneven disc characteristics over its recording surface.

As a result, the signals containing accurate information regarding the position of the objective lens in the tracking direction can be acquired.

The regulation information includes at least one of amplitude regulation information for regulating amplitude of, and track balance regulation information for regulating track balance of track-error signals.

In the case where the regulation information includes the amplitude regulation information, the amplitude of track-error signals is regulated using the noted amplitude regulation information.

By contrast, in the case where the regulation information includes the track balance regulation information, the track balance of track-error signals is regulated using the noted track balance regulation information.

In addition, the step of acquiring regulation information can be carried out prior to the step of regulating signals on each the plurality of regulating zones.

Furthermore, the step of acquiring regulation information is implemented upon detecting the optical disc being loaded.

According to another aspect, a position control method is provided for controlling the position of an objective lens in the tracking direction.

This position control method is adapted to control the position of an objective lens in the tracking direction perpendicular to the tangential direction with respect to the track formed on the optical recording disc.

Accordingly, the signals containing information regarding the position of the objective lens in the tracking direction can be regulated by the above noted method steps of signal regulation. Since this signal regulation can be carried out even for some discs of low quality for which error correction has been considered necessary, proper positioning of the objective lens becomes feasible.

As a result, the position of the objective lens in the tracking direction can be controlled with high precision.

According to still another aspect, the steps included in the above-mentioned methods are implemented with a computer program product for use with a control computer in an optical disk system configured to have access to an optical recording disc, comprising a computer usable medium having computer readable program code means embodied in the medium for causing these steps, in which the computer readable program code means includes means for acquiring a target region for the access in response to an access request onto the optical recording disc, and means for regulating signals containing information regarding the position of an objective lens in the direction perpendicular to the tangential direction with respect to track corresponding to the regulating zone including the target region to be regulated out of a plurality of regulating zones formed by dividing a plurality of the track utilizing regulation information acquired previously.

Accordingly, when a program disclosed herein is loaded into a predetermined memory and a leading address of the program is set into a program counter, a control computer included in the optical disk system operates, in response to an access request onto the optical recording disc, to acquire a target region for the noted access in response to an access request onto said optical recording disc, and to regulate the signals containing information regarding the position of the objective lens in the direction perpendicular to the tangential direction with respect to the track, utilizing regulation information acquired previously corresponding to a regulating zone including the target region to be regulated out of a plurality of regulating zones formed by dividing a plurality of the track.

As a result, the signals containing accurate information regarding the position of objective lens in the tracking direction are acquired.

Also, in this case, the regulation information includes at least one of amplitude regulation information for regulating amplitude of, and track balance regulation information for regulating track balance of track-error signals.

In the case where the regulation information includes the amplitude regulation information, the step of regulating the amplitude of track-error signals is executed as the step of regulating the signals by the control computer using the amplitude regulation information.

By contrast, in the case where the regulation information includes the track balance regulation information, the step of regulating the track balance of track-error signals is executed as the step for regulating the signals by the control computer using the track balance regulation information.

In the case where the regulation information includes both the amplitude regulation information and track balance regulation information, the steps of regulating the amplitude of track-error signals using the amplitude regulation information and regulating the track balance of track-error signals using the track balance regulation information are executed as the steps for regulating the signals by the control computer.

In addition, the present computer readable program code means additionally includes the means of acquiring regulation information on each of the plurality of regulating zones prior to the step of regulating signals, which is implemented upon detecting the optical disc being loaded.

Also, the computer program product comprising the computer readable program code means is disclosed herein, which additionally includes means for controlling the position of the objective lens in the tracking direction based on the signals containing information regulated by the signal regulating means.

According to another aspect, there disclosed also herein is a program storage device readable by a machine, tangibly embodying a program of instructions executable by the machine to perform method steps above-mentioned.

By properly storing the abovementioned program steps in the program storage device and executing these steps by the control computer, the signals containing accurate information regarding the position of objective lens in the tracking direction can be acquired.

According to another aspect, an optical disc system is provided, which is configured to have access to the an optical recording disc, including a regulating unit for regulating signals containing information regarding the position of an objective lens, an optical pickup unit for illuminating light beams onto the recording surface of the recording disc and to receive further light beams reflected back from the recording surface, and a process unit adapted to implement the access utilizing signals output from the optical pickup unit.

Accordingly, in response to an access request onto the optical recording disc, the signals containing information regarding the position of the objective lens in the direction perpendicular to the tangential direction with respect to the track, are regulated by the regulating unit utilizing regulation information acquired previously corresponding to a regulating zone including the target region to be regulated to be regulated out of a plurality of regulating zones formed by dividing a plurality of the track.

In such circumstances, low quality discs are now re-examined for which error correction has been considered necessary.

Namely, by controlling the position of the objective lens in the tracking direction on the low quality discs based on the signals containing information regarding the position of the objective lens in the tracking direction regulated by means of the above mentioned method steps, the signal regulation is suitably carried out corresponding to each specified access zone for even low quality discs, and proper positioning of the objective lens may sometimes become feasible.

As a result, the access to the optical discs including some low quality discs is feasible with high precision.

The regulating unit in the optical disc system may additionally include either an amplitude regulating unit for regulating amplitude or a track balance regulating unit for regulating track balance of track-error signals.

In addition, the optical disc system may additionally include a regulation information acquisition unit for acquiring regulation information on each the plurality of regulating zones.

The optical disc system may further include a memory for storing the regulation information and storage means for storing the regulation information in the memory.

Having described the present disclosure in general, the following description is provided further to illustrate preferred embodiments of the invention.

FIG. 1 is a diagrammatical block diagram illustrating an optical disc system according to one embodiment disclosed herein.

Referring to FIG. 1, the optical disc system 20 includes a spindle motor 22 for rotating an optical disc 15, an optical pickup 23, a laser control circuit 24, an encoder 25, a motor driver 27, a playback signal processing circuit 28, a servo controller 33, a buffer RAM 34, a buffer manager 37, an interface 38, a flash memory 39, CPU 40, and RAM 41 as a memory.

It should be added that wire connections in FIG. 1 are drawn to typically represent the flow of signals and information and not necessarily all of the interconnections in the apparatus. In addition, the optical discs illustrated herein are assumed to conform to DVD standards.

Figure 2:
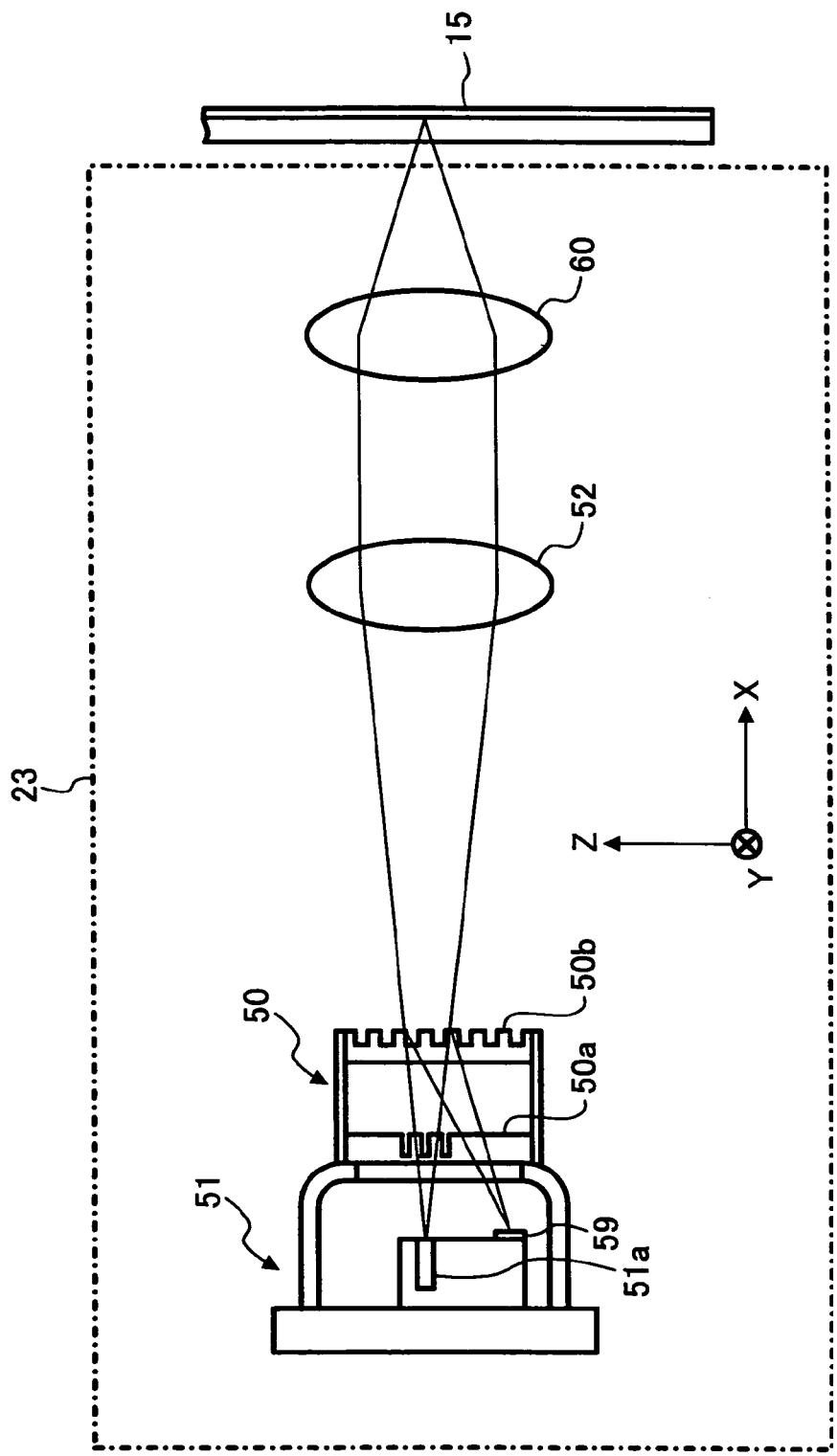
FIG. 2 is a drawing illustrating the optical pickup of FIG. 1.

The optical pickup 23 is formed as illustrated in FIG. 2, including at least a photo-module 51 for light emitting and receiving, a diffraction unit 50, a collimator lens 52, an objective lens 60, and a driving unit (not shown).

The photo-module 51 is provided with a semiconductor laser 51a as a source for emanating laser light at the wavelength of 650 nm, and a photo-receptor 59 for receiving return light beams. In addition, the light beams emanated from the photo-module 51 are assumed herein to have the maximum intensity in the direction of the +X axis in the drawing.

The photo-receptor 59 is placed in the vicinity of the semiconductor laser 51a to receive return beams diffracted back from diffraction unit 50. The photo-receptor 59 consists of multiple photo-receiving elements which are adapted to operate according to the aforementioned DPP method. The photo-receiving elements are adapted each to carry out photoelectric transformation to output the current (current signals) to playback signal processing circuit 28 according to the amount of light received.

Being placed on the side of the +X direction from photo-module 51, the diffraction unit 50 is formed including a grating 50a and a hologram 50b.

The grating 50a is adapted to diffract the light beams emitted from the photo-module 51 (which is hereinafter abbreviated as emitted light beams) to divide into three beams such as those each having the order numbers of +1, 0, and −1, among others.

In addition, these light beams are formed such that the (+1)-order and (−1)-order beams are each shifted by one-half track pitch in the tracking direction with respect to the 0-order beams.

The hologram 50b is positioned in the +X direction further away from photo-module 51, and adapted to diffract, toward a receiving surface of the photo-receptor 59, the return beams reflected back from the surface of recording medium.

It is noted the distance is adjusted to approximately from 1.5 to 2.0 mm between the hologram 50b and grating 50a so that the beams diffracted by the former are not further diffracted by the latter.

The collimator lens 52 is positioned in the +X direction from the diffraction unit 50 and adapted to approximately collimate each of the three divided beams formed earlier.

In addition, the objective lens 60 is placed on the side of the +X direction from the collimator lens 52, and adapted to focus each of the three divided beams transmitting through the collimator lens 52 and to form light spots of respective three divided beams on the recording surface of the optical disc 15.

The driving unit consists of two units, one a minute driving unit in use for relatively a small magnitude of driving, and the other a coarse driving unit for a large magnitude.

The minute driving unit includes a focusing actuator for minutely driving the objective lens 60 in the direction of optic axis (or focusing direction) and a tracking actuator for minutely driving the lens 60 in the tracking direction.

In addition, the coarse driving unit includes at least a seek motor (coarse driving motor) for driving the light pickup, which consists at least of the photo-module 51, optics unit, and minute driving unit, in the radial direction of the recording disc.

The focusing direction is along the X-axis, while the tracking direction is along the Z-axis or the redial direction of the disc.

Figure 3:
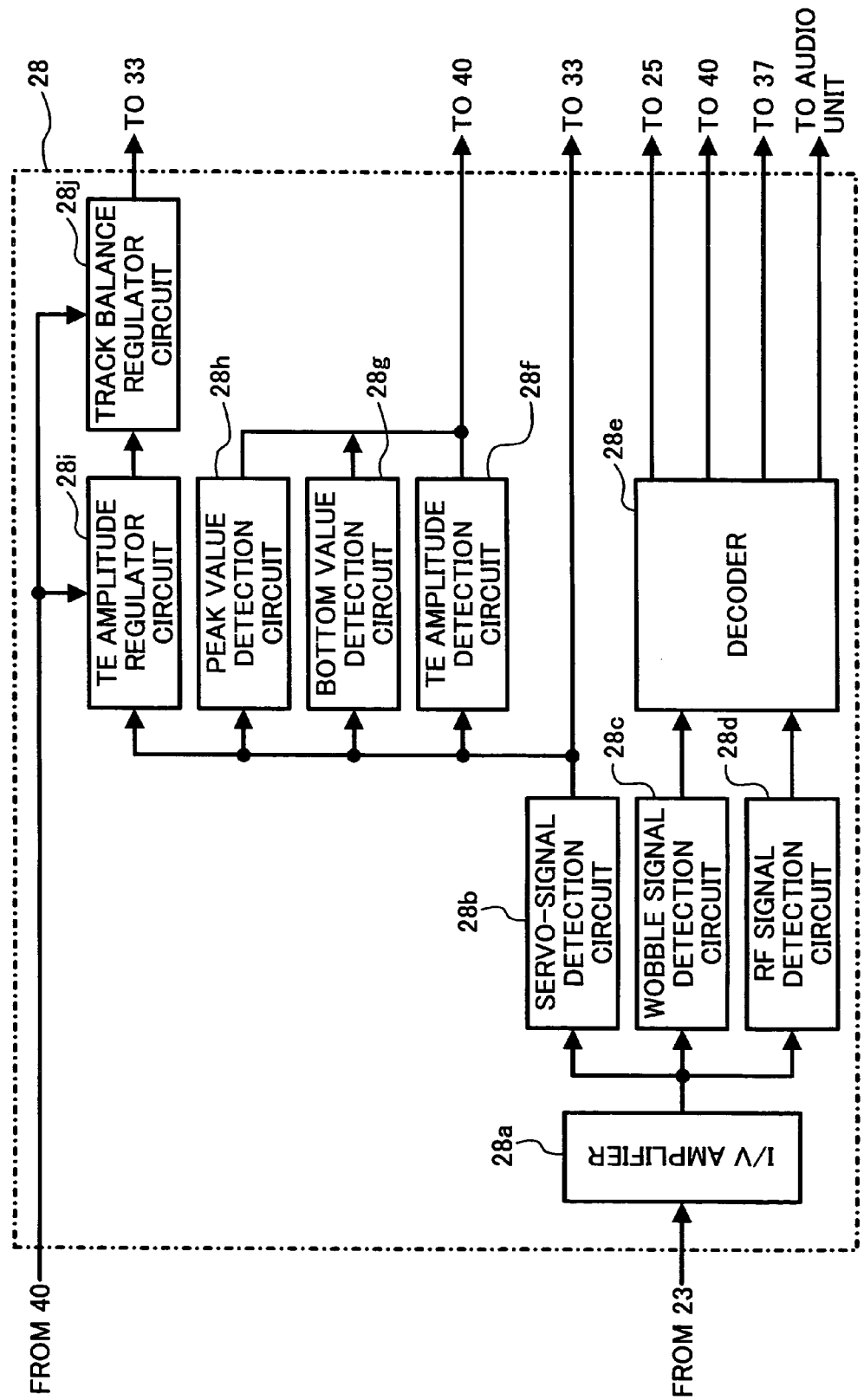
FIG. 3 is a block diagram illustrating the playback signal processing circuit of FIG. 1.

Referring to FIG. 3, the playback signal processing circuit 28 includes an I/V amplifier 28a, a servo-signal detection circuit 28b, a wobble signal detection circuit 28c, an RF signal detection circuit 28d, a decoder 28e, a TE amplitude detection circuit 28f, a bottom value detection circuit 28g, a peak value detection circuit 28h, a TE amplitude regulator circuit 28i, and a track balance regulator circuit 28j.

The I/V amplifier 28a is adapted to convert signals output from photo-receptor 59 to voltage signals so as to be amplified with a predetermined gain.

The servo-signal detection circuit 28b is adapted to detect servo-signals (including focus error and track error signals) according to signals output from the I/V amplifier 28a. The aforementioned DPP method may be utilized as the method of detecting the track error signals, for example.

The wobble signal detection circuit 28c is adapted to detect wobble signals according to signals output from the I/V amplifier 28a.

The RF signal detection circuit 28d operates to detect RF signals according to signals output from the I/V amplifier 28a.

The decoder 28e is adapted to extract ADIP (Address in Pregroove) information and synchronization signals from detect wobble signals detected by wobble signal detection circuit 28c. The extracted ADIP information is then output to CPU 40, while the synchronization signals are sent to encoder 25.

In addition, the decoder 28e is adapted to implement predetermined processes of encoding and error detection onto RF signals detected by RF signal detection circuit 28d. The processed signals are then stored as playback data in the buffer RAM 34 by way of the buffer manager 37.

In the case where the stored data is music, the data is D/A converted and then output from the decoder 28e to audio equipment, for example. Incidentally, the decoder 28e implements predetermined error correction process in the case where errors are detected in the above noted error detection process.

The TE amplitude detection circuit 28f is adapted to detect the amplitude of track error signals (which is hereinafter referred to as "TE amplitude") detected by the servo-signal detection circuit 28b. The detected TE amplitude is then output to CPU 40.

The bottom value detection circuit 28g detects a bottom level of track error signals detected by the servo-signal detection circuit 28b to subsequently output to CPU 40.

The peak value detection circuit 28h detects a peak level of track error signals detected by the servo-signal detection circuit 28b to subsequently output to CPU 40.

The TE amplitude regulator circuit 28i is adapted to regulate the amplitude of track error signals detected by the servo-signal detection circuit 28b according to the value of regulated TE amplitude, which will be described later, output from CPU 40.

The track balance regulator circuit 28j operates to regulate the track balance regulated by the TE amplitude regulator circuit 28i according to the value of regulated TB output from CPU 40, which will be described later.

The thus regulated track error signals are output to the servo controller 33. Incidentally, servo-signals other than track error signals are output from the servo-signal detection circuit 28b to the servo controller 33.

Referring again to FIG. 1, the servo controller 33 is adapted to generate focus control signals in use for correcting focal deviation according to focus error signals output from the playback signal processing circuit 28.

In addition, this controller 33 operates to generate track control signals for correcting tracking deviation according to track error signals output also from the playback signal processing circuit 28.

Respective control signals thus generated are output to the motor driver 27 in the case of servo-on, while not output in the case of servo-off. The servo on/off control is carried out by CPU 40.

The motor driver 27 operates to output driving signals for the focusing actuator to the optical pickup 23 according to the focus control signals, and also output driving signals for the tracking actuator to the pickup 23 according to the track control signals. That is, the tracking and focusing controls are implemented by the playback signal processing circuit 28, servo controller 33, and motor driver 27.

In addition, the motor driver 27 operates to output the signals for driving a spindle motor 22 and the noted seek motor (coarse driving motor) according to the control signals supplied from CPU 40.

The buffer RAM 34 consists of a buffer region for temporarily storing data such as data to be recorded on an optical disc (recording data) and data readout from an optical disc (readout data or playback data), and a variable region for storing various kinds of program variables and other information.

The buffer manager 37 is adapted to control input/output of the data between the buffer RAM 34 and to inform to CPU 40 when the amount of data stored in the buffer region reaches a predetermined value.

According to instructions from CPU 40, the encoder 25 operates to implement several processes such as retrieving recording data stored in the buffer region included in buffer RAM 34 by way of the buffer manager 37, carrying out a predetermined process of data modulation and affixing error correction codes, generating writing signals into an optical disc 15, and outputting the writing signals to a laser control circuit 24 synchronized with synchronizing signals supplied by playback signal processing circuit 28.

The laser control circuit 24 operates to control the power of laser emission of the semiconductor laser 51a according to the writing signals supplied by encoder 25 and instructions from CPU 40.

The interface 38 included in the optical disc system 20 is a bidirectional communication interface with a host (PC, for example), which is in conformity with ATAPI (AT Attachment Packet Interface) standards, for example.

The flash memory 39 consists of program and data regions. This memory 39 is essentially a non-volatile memory capable of retaining its data when power is removed.

Stored in the program region of the flash memory 39 are programs for regulating track error signals according to one embodiment disclosed herein, which are hereinafter referred to as "TE signal regulating programs." These programs are described in the codes decipherable by CPU 40 and will be detailed later on.

In the data region of the flash memory 39, a method of track partition is stored as track partition information, which is utilized for controlling the position of objective lens 60 in the tracking direction.

Figure 4:
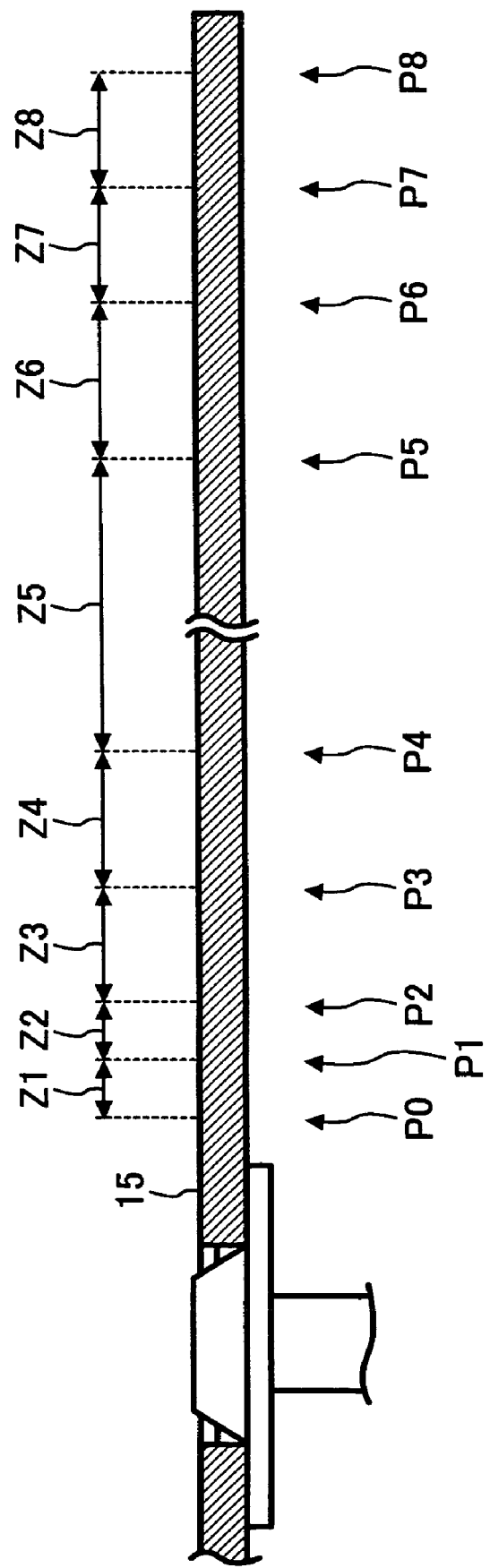
FIG. 4 is a drawing illustrating the zone partition adopted presently according to one embodiment disclosed herein.

Referring to FIG. 4, for example, the position control herein is assumed to be carried out by dividing the tracks into eight regions (i.e., zones). The eight zones are defined as the regions according to the distance P from the center of rotation of the optical disc.

Namely, the zone 1 (Z1) is defined corresponding to the region with the distance P ranging from 0 to P1, i.e., $0<P<P1$. In a similar manner, the zones Z2, Z3, Z4, Z5, Z6, Z7, and Z8 correspond to the regions of $P1<P<P2$, $P2<P<P3$, $P3<P<P4$, $P4<P<P5$, $P5<P<P6$, $P6<P<P7$, and $P7<P<P8$, respectively.

In optical discs, in general, the zones relatively close to either the center of rotation or the outer edge of the discs are each set to have a width narrower than other zones since disc characteristics are likely to fluctuate more in the center and edge regions.

In the data region of the flash memory 39, information (i.e., seek information) regarding seek movements is stored.

The CPU 40 controls the above-mentioned units and devices according to the noted programs stored in the program region of flash memory 39 and stores the data necessary for control in the RAM 41 and buffer RAM 34.

Acquisition Process of TE Signal Regulating Value

The acquisition of a regulation value of track balance (i.e., "TB regulation value") and a further regulation value of TE amplitude (i.e., "TE amplitude regulation value") is carried out when an optical disc 15 is loaded on the optical disc system 20.

The acquisition process of the TB regulation value and TE amplitude regulation value is carried out in the system according to one embodiment is described herein below in reference to FIGS. 5 through 7.

Figure 5:
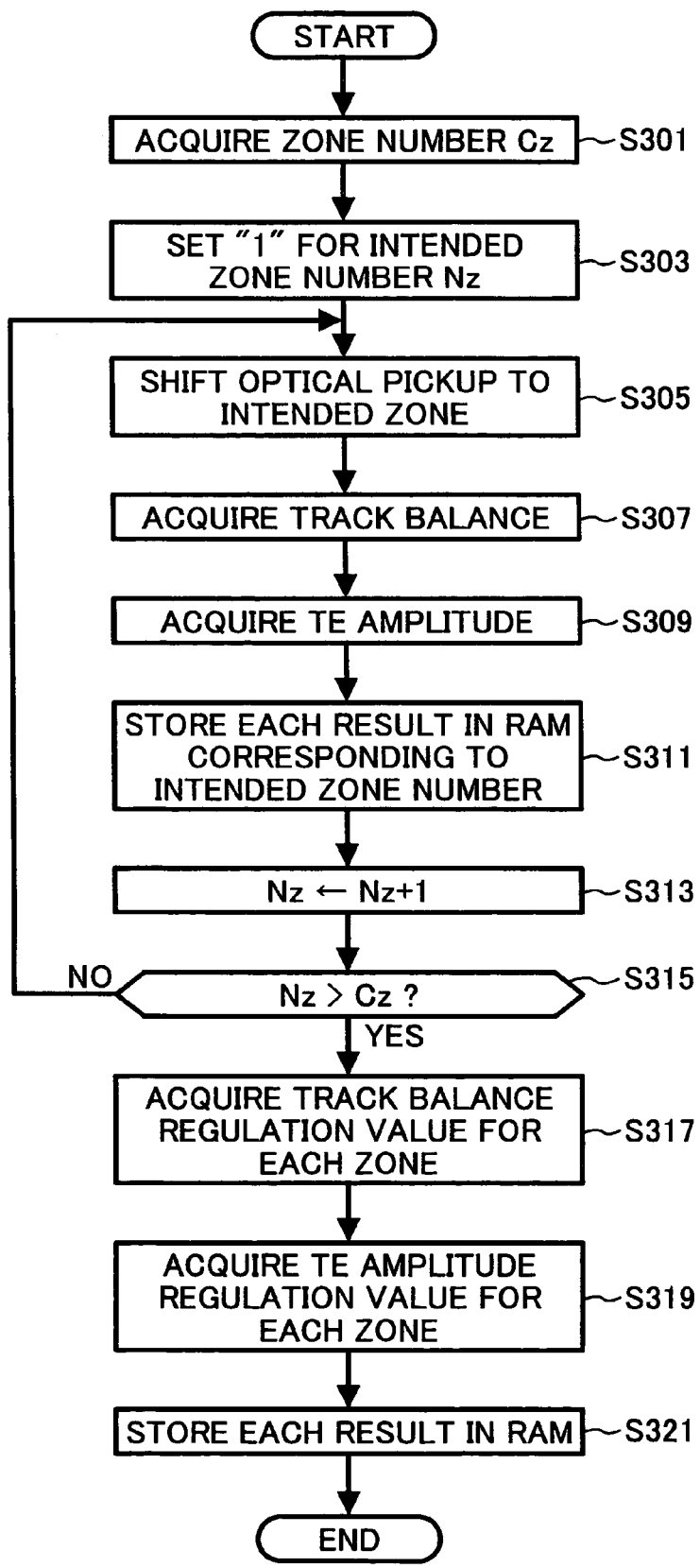
FIG. 5 contains a flow chart illustrating a process executed by a CPU for acquiring TB and TE regulation values for each zone.

The steps included in the flowchart in FIG. 5 correspond to a series of processes executed by CPU 40. Upon detecting an optical disc being loaded, the leading address of the program, which corresponds to the flowchart in FIG. 5, is set onto the program counter of CPU 40 and the acquisition process of the TB and TE regulation values is initiated.

In the first steps 301, a zone number Cz is obtained by reference to the above noted track partition information stored in the flash memory 39. As stated earlier, Cz=8 is assumed in the present case.

The term "intended zone" is defined herein for the sake of simplicity to identify the zone for which the acquisition of the regulation values is intended presently.

In the next steps 303, "1" is set for the number Nz for representing the present intended zone (i.e., "intended zone number"), whereby the number Nz has been initialized.

Thereafter, control signals are output to the motor driver 27 in steps 305 such that the head of optical pickup is shifted to a predetermined position of the intended zone. The location approximately in the middle of zone may be taken as the predetermined position, for example.

On arriving at the predetermined position for the head, the process proceeds to steps 307.

In the steps 307, the track balance is acquired as follows. Namely, a middle level of the track error signals is calculated from the bottom level of track error signals previously obtained by bottom value detection circuit 28g and the peak level of track error signal obtained by the peak value detection circuit 28h. The track balance is then obtained from the difference between the thus obtained middle level and a base level.

In the next steps 309, the TE amplitude is obtained by way of the TE amplitude detection circuit 28f.

The thus acquired track balance and TE amplitude are subsequently stored in RAM 41 as the data corresponding to the present intended zone number.

In steps 313, by adding "1" to the intended zone number Nz, a further zone is taken as the newly intended zone.

After steps 313, the process proceeds to steps 315, where an inquiry is made whether the intended zone number Nz exceeds the zone number Cz. Since the response to the inquiry is negative indicating that the number Nz (=2) is smaller than Cz (=8), the process returns to the steps 305.

Thereafter, the steps 305 through steps 315 are repeated until the response to the inquiry in the steps 315 turns affirmative.

If the response to the inquiry is found affirmative indicating that the number Nz exceeded Cz, the process proceeds to steps 317.

In the steps 317, the values of track balance for the respective zones stored in RAM 41 are readout and TB regulation values are computed for respective zones such that the track balance becomes approximately zero.

Figure 6A:
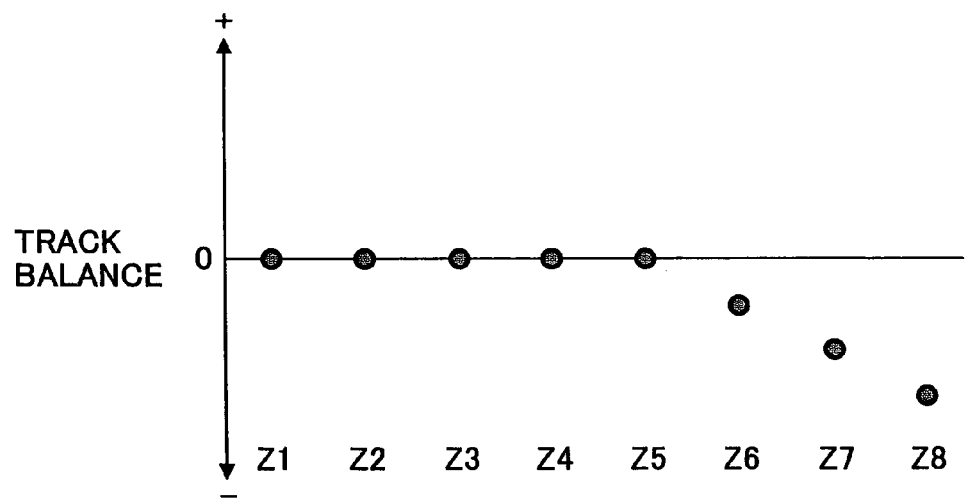
FIG. 6A is a graphical plot illustrating track balance (TB), vertically, acquired for each zone, horizontally.
Figure 6B:
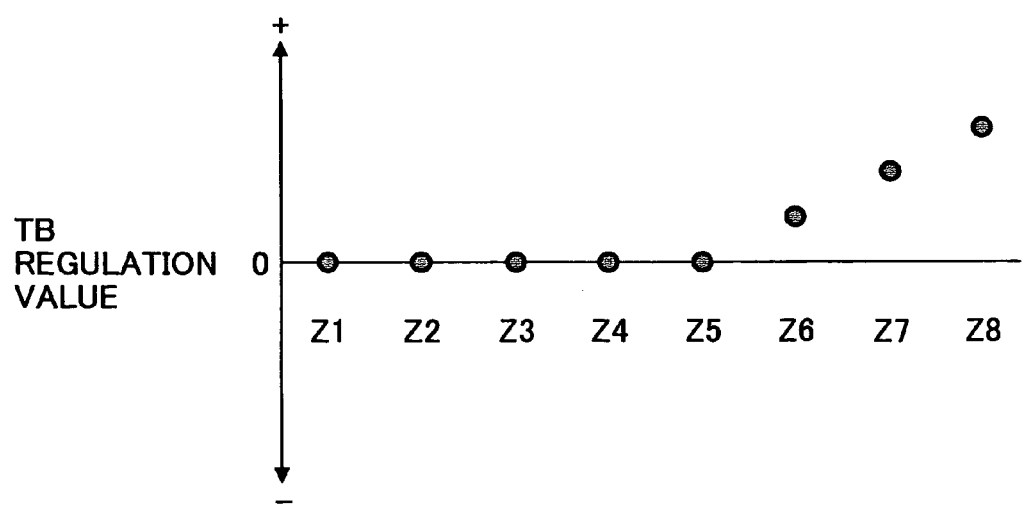
FIG. 6B is a graphical plot illustrating TB regulation values set presently for each zone to compensate the track balance of FIG. 6A.

For example, in the case shown in FIG. 6A where the deviation of track balance becomes evident toward zones 6 through 8, the TB regulation values are set as shown in FIG. 6B.

In the next steps 319, the values of TE amplitude for respective zones stored in RAM 41 are readout and TE amplitude regulation values are computed for respective zones such that the TE amplitude becomes approximately the same.

Figure 7A:
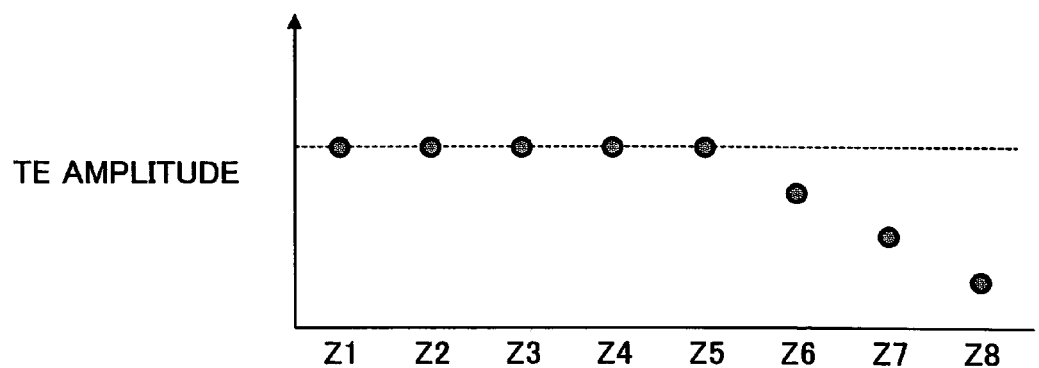
FIG. 7A is a graphical plot illustrating track-error (TE) amplitude acquired for each zone.
Figure 7B:
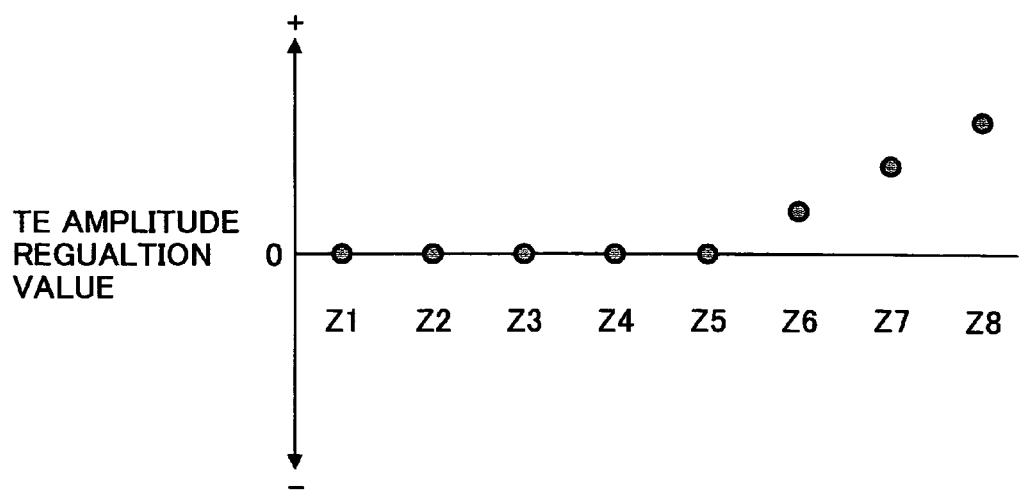
FIG. 7B is a graphical plot illustrating TE amplitude regulation values set presently for each zone to compensate the TE amplitude of FIG. 7A.

For example, in the case shown in FIG. 7A where the decrease in TE amplitude is found toward the zones 6 through 8, the TE amplitude regulation values are set as shown in FIG. 7B such that the decrease is cancelled out.

Subsequently in steps 321, the thus obtained TB regulation values are stored as TB regulation information in RAM 41 and TE amplitude regulation values are stored as TE amplitude regulation information in a similar manner, and the acquisition process of the regulation values ends.

Playback Process

In next place, process steps for playing back the data recorded on an optical disc 15 (hereinafter referred to as "playback process"), which are carried out in the optical system 15, according to one embodiment are described herein below in reference to FIG. 8.

Figure 8A:
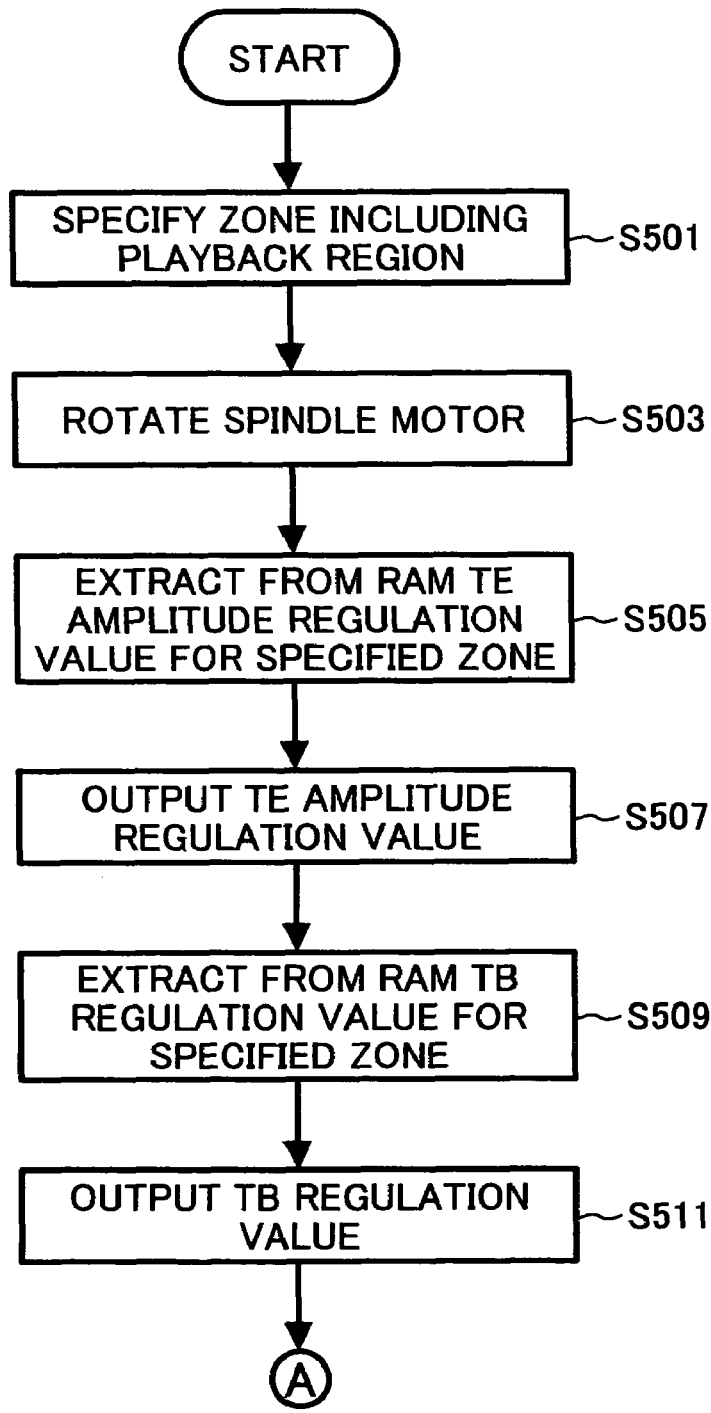
FIG. 8 contains a flow chart illustrating process steps for playing back the information recorded on an optical recording disc.
Figure 8B:
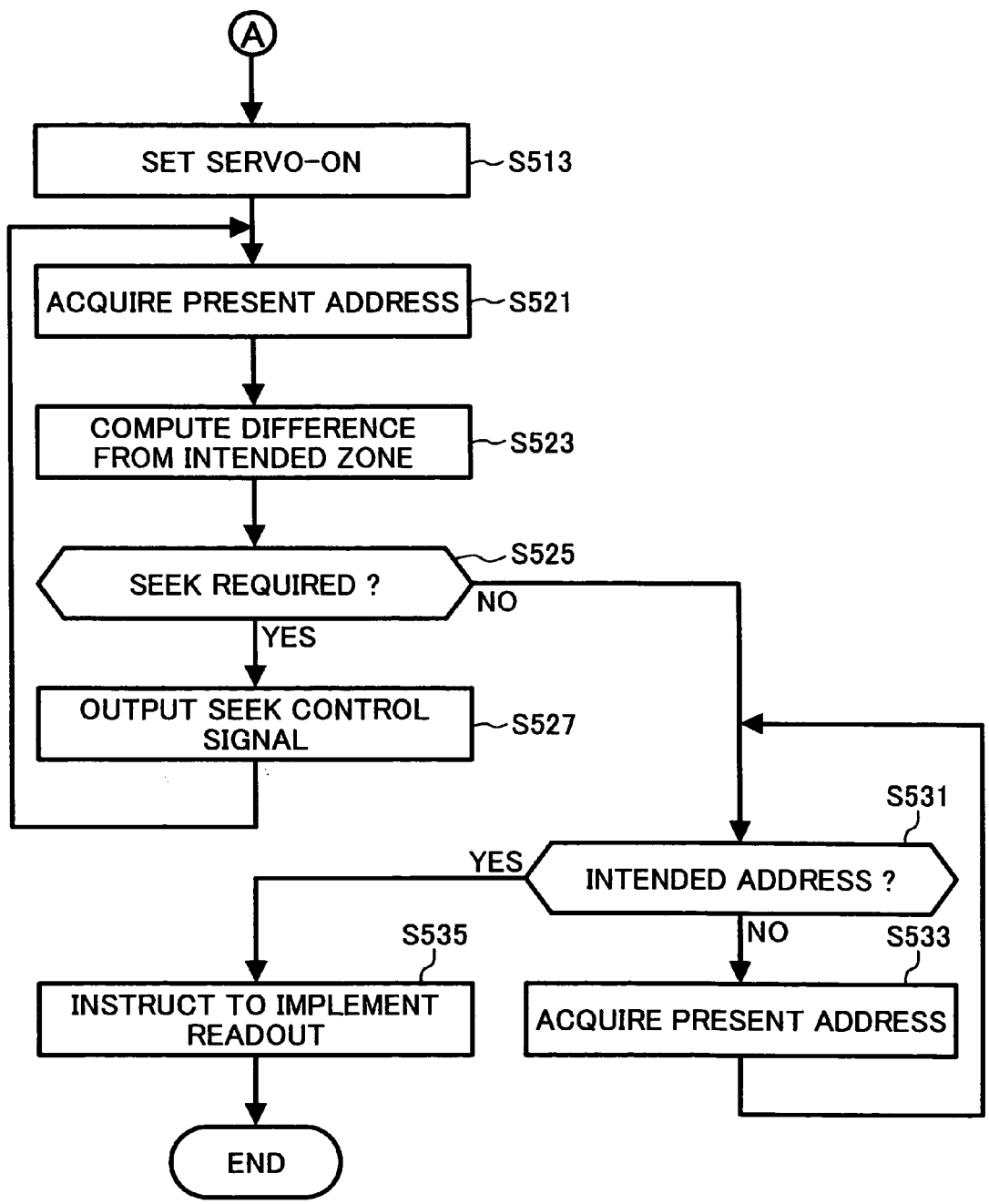

The steps included in the flowchart in FIG. 8 correspond to a series of processes executed by CPU 40.

Upon receiving a playback request command from the host, the leading address of the program, which corresponds to the flowchart in FIG. 8, is set onto the program counter of CPU 40 and the playback process is initiated.

It is assumed herein for the sake of simplicity that the region from which data is played back (i.e., playback region) is included in one single zone.

In the first steps 501, the zone is specified, in which the playback region is included, by reference to the above noted track partition information stored in the flash memory 39. The thus specified zone is hereinafter referred to as "specified zone".

After the steps 501, the process proceeds to steps 503, where control signals are output to the motor driver 27 to control the rotation of spindle motor 22 according to a playback speed. In addition, playback signal processing circuit 28 is notified that the playback request command has been received from the host.

In the steps 505, the TE amplitude regulation value for the specified zone is extracted from the TE amplitude regulation information previously stored in the RAM 41. The thus extracted TE amplitude regulation value is then output to TE amplitude regulator circuit 28i in steps 507.

In the next steps 509, the TB regulation value for the specified zone is extracted from the TB regulation information previously stored in the RAM 41. The thus extracted TB regulation value is then output to track balance regulator circuit 28j in steps 511.

After steps 511, the process proceeds to steps 513, where an inquiry is made whether a linear velocity of the rotation of the optical disc reach a predetermined value.

If the response to the inquiry is found affirmative indicating the linear velocity has reached the predetermined value, the servo-on is set on servo controller 33, whereby tracking and focusing controls are carried out as described earlier.

It may be added that the tracking control is implemented according to track error signals which are amplitude regulated by TE amplitude regulator circuit 28i and track balance regulated by the track balance regulator circuit 28j.

In the next steps 521, a present address is acquired based on the ADIP information supplied by the playback signal processing circuit 28.

Thereafter, an address difference is computed in steps 523 as the difference between the present address and the intended address extracted by the playback request command.

After steps 523, the process proceeds to steps 525, where an inquiry is made on whether seek movements are necessary based on the address difference. If the response to the inquiry is found affirmative indicating the seek movements are necessary because the address difference has exceeded the threshold value, which is obtained by reference to the threshold stored in the flash memory 39, the process proceeds to steps 527.

In this steps 527, control signals for the seek motor are output to the motor driver 27 according to the address difference. The seek motor is then driven, whereby seek movements are carried out. Thereafter, the process returns to the previous steps 521.

In contrast, if the response to the inquiry is found negative indicating the address difference has not exceeded the threshold value, the process proceeds to steps 531.

In this steps 531, an inquiry is made whether the present address is in agreement with the intended address. If the response to the inquiry is found negative indicating the present address is not in agreement with the intended address, the process proceeds to steps 533.

A present address is acquired in this steps 533 based on the ADIP information supplied by the playback signal processing circuit 28.

Thereafter, the steps 531 through steps 533 are repeated until the response to the inquiry in the steps 531 turns affirmative.

If the response to the inquiry in the steps 531 is found affirmative indicating that the present address is in agreement with the intended address, the process proceeds to steps 535.

In this steps 535, the playback signal processing circuit 28 is instructed to implement readout.

Accordingly, the played back data is acquired by way of RF signal detection circuit 28*d* and decoder 28*e*, and subsequently stored in the buffer RAM 34. The playback data in sectors is then forwarded to the host by way of buffer manager 37 and interface 38. The process then ends.

Record Process

Process steps for recording data on an optical disc 15 (hereinafter referred to as "record process"), which are carried out in the optical system 15, according to one embodiment are described herein below in reference to FIG. 9.

Figure 9A:
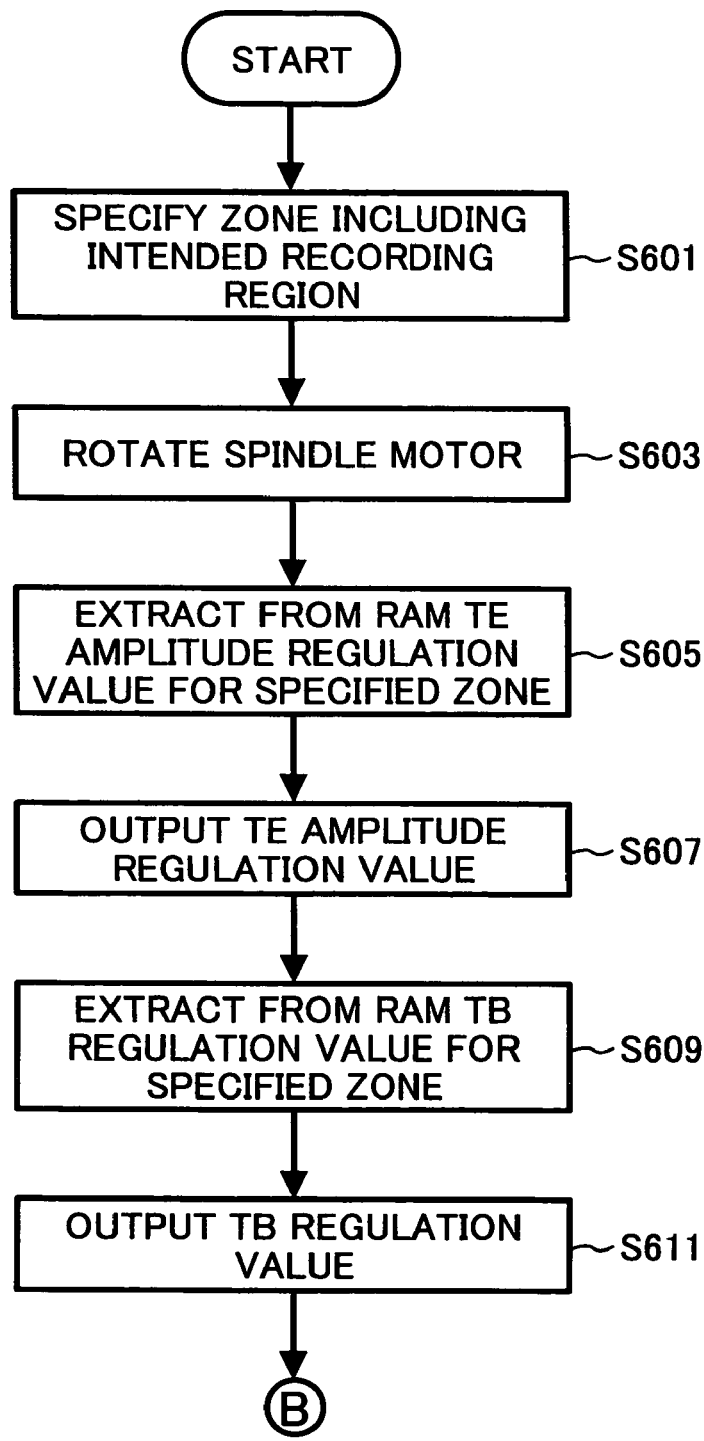
FIG. 9 contains a flow chart illustrating process steps for recording data on an optical disc.
Figure 9B:
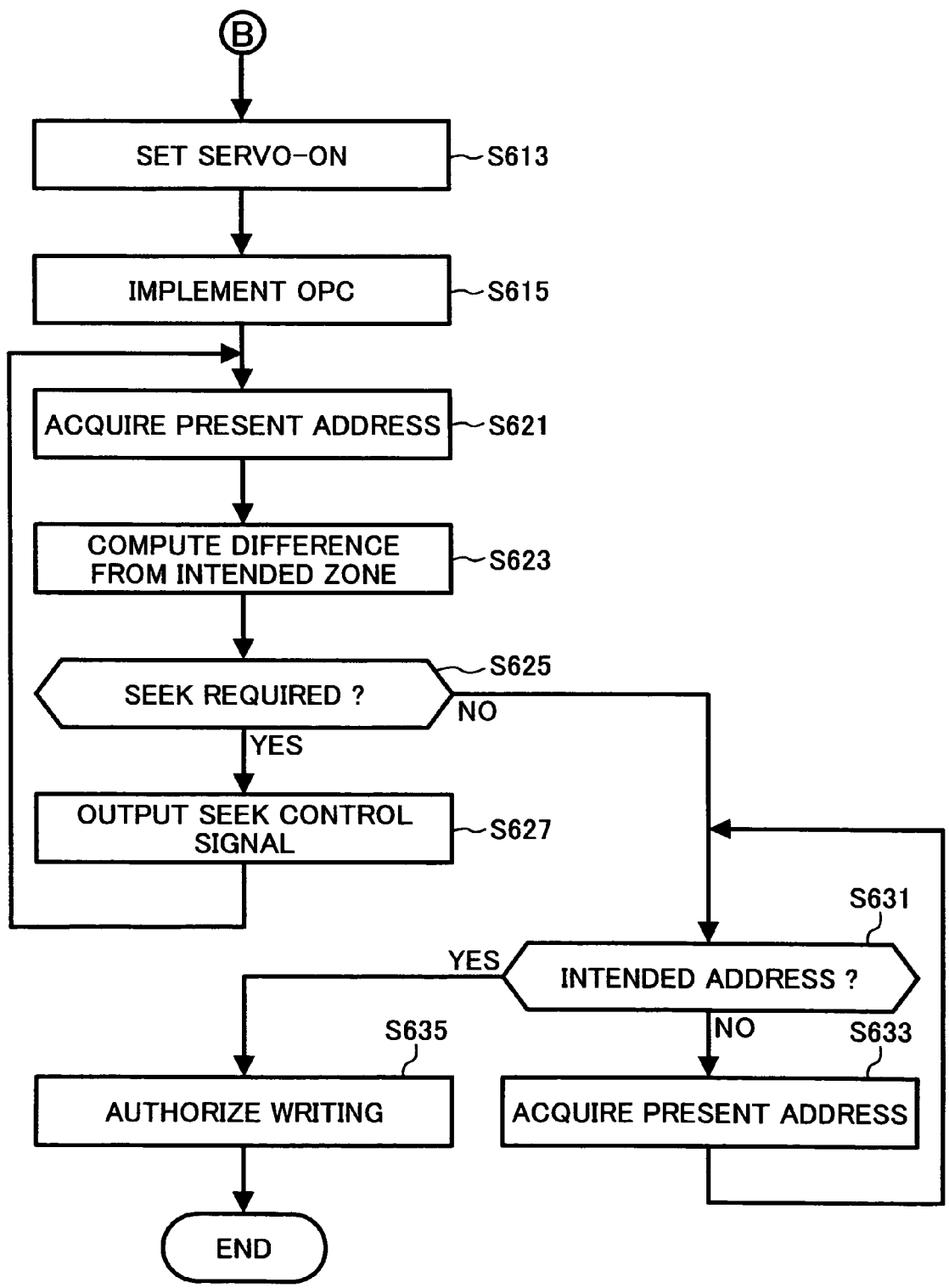
Figure 10:
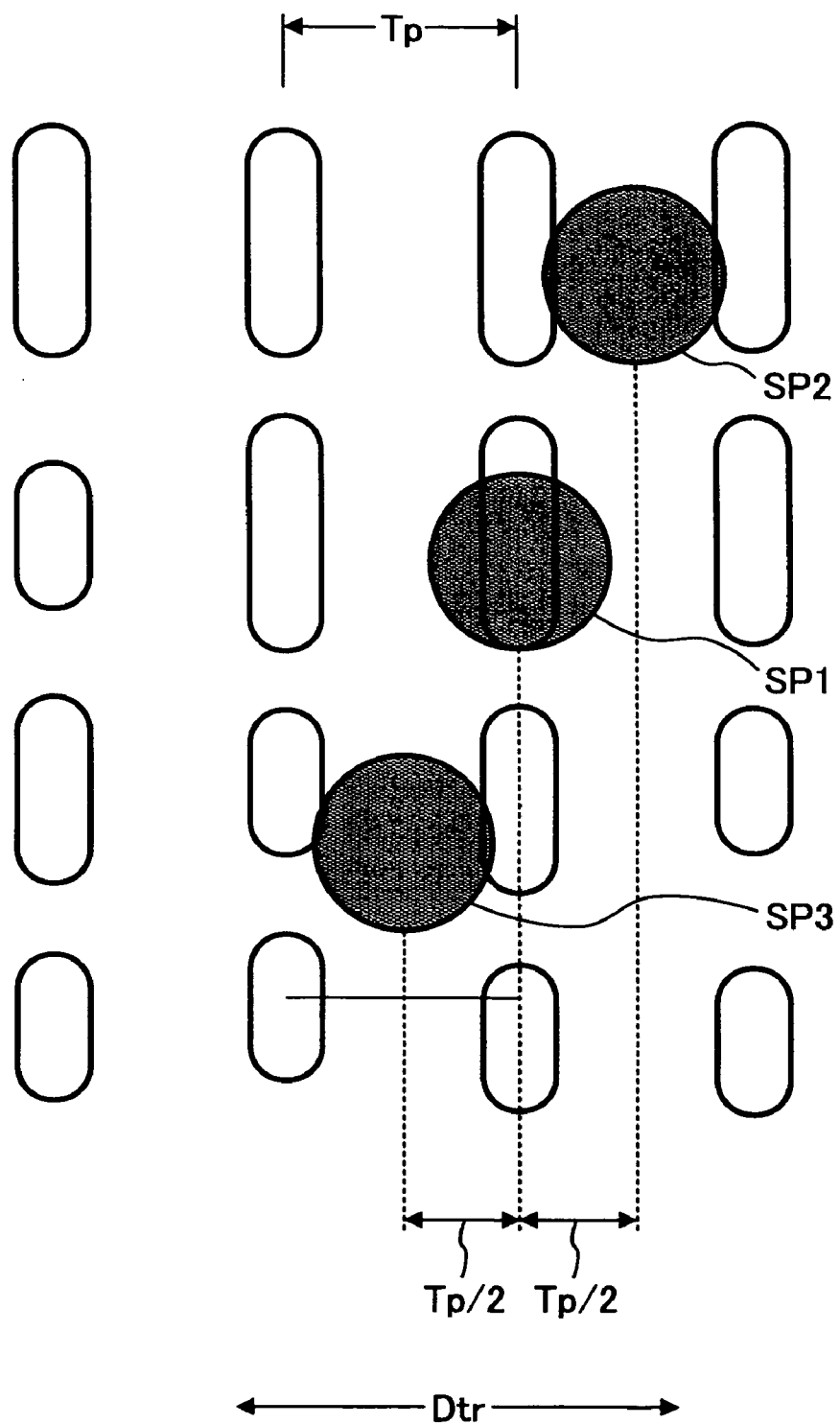
FIG. 10 is a drawing illustrating the positional relationship among light beams in the differential push-pull method.

The steps included in the flowchart in FIG. 9 correspond to a series of processes executed by CPU 40.

Upon receiving a record request command from the host, the leading address of the program, which corresponds to the flowchart in FIG. 9, is set onto the program counter of CPU 40 and the record process is initiated.

It is assumed herein for the sake of simplicity that the region in which data is to be recorded (i.e., intended record region) is included in one single zone.

In the first steps 601, the zone is specified, in which the intended record region is included, by reference to the above noted track partition information stored in the flash memory 39.

After steps 601, the process proceeds to steps 603, where control signals are output to the motor driver 27 to control the rotation of the spindle motor 22 according to a recording speed.

In addition, playback signal processing circuit 28 is notified that the record request command has been received from the host and the buffer manager 37 is instructed to accumulate the data received from the host into the buffer RAM 34.

Furthermore, on receiving the notice indicating that the amount of the data accumulated in the buffer RAM has exceeded a predetermined value, the buffer manager 37 instructs encoder 25 to generate write signals.

In the following steps 605 through steps 613, steps similar to those in the previous steps 505 through steps 513 are implemented.

In steps 615, OPC (Optimum Power Control) is carried out according to the recording speed in order to acquire an optimum recording power.

The optimum recording power is obtained by first applying recording power with incremental steps of changing intensity; then test writing predetermined data into a test writing region called PCA (Power Calibration Area); successively playing back the data; obtaining from the played back data a characteristic value such as, for example, asymmetry value deduced from PF signals; finding the point of the applied power, at which the asymmetry value obtained as above coincides approximately with its target value previously obtained from separate experiments, for example; and taking the thus determined power as the most desirable record quality, thereby designating as the optimum recording power.

In the next steps 621, a present address is acquired based on the ADIP information supplied by the playback signal processing circuit 28. Thereafter, an address difference is computed in steps 623 as the difference between the present address and the intended address extracted by the playback request command.

After steps 623, the process proceeds to steps 625, where an inquiry is made on whether seek movements are necessary based on the address difference. If the response to the inquiry is affirmative indicating the seek movements are necessary, the process proceeds to steps 627.

In this steps 627, control signals for the seek motor are output to the motor driver 27 according to the address difference.

Thereafter, the process returns to the previous steps 621.

In contrast, if the response to the inquiry is found negative indicating the seek movements are unnecessary, the process proceeds to steps 631.

In this steps 631, an inquiry is made on whether the present address is in agreement with the intended address. If the response to the inquiry is found negative indicating the present address is not in agreement with the intended address, the process proceeds to steps 633.

A present address is acquired in this steps 633 based on the ADIP information supplied by the playback signal processing circuit 28.

Thereafter, the process returns to the previous steps 631.

The steps 631 through steps 633 are then repeated until the response to the inquiry in the steps 631 turns affirmative.

If the response to the inquiry in the steps 631 is found affirmative indicating that the present address is in agreement with the intended address, the process proceeds to steps 635.

In steps 635, the encoder 25 is instructed to authorize writing data. The data is then written into an optical recording disc 15 by way of the encoder 25, laser control circuit 24, and optical pickup 23. When all data is written, the recording process is completed.

In the optical disc system according to embodiments disclosed herein, therefore, the means for controlling, acquiring control information, storing and processing apparatus are implemented by CPU 40 and programs executed by the CPU 40.

Namely, there implemented regarding the playback process are the controlling means through the process in the steps of 507 and steps of 511 included in FIG. 8, and the processing apparatus through the process in the steps of 535 also in FIG. 8.

Regarding the record process, the control means is implemented through the process in the steps of 607 and steps of 611 in FIG. 9, and the processing apparatus through the process in the steps of 635 in FIG. 9.

In addition, there implemented are the control information acquiring means through the process in the steps from 301 to 319 included in FIG. 5, and the storing means through the process in the step of 321.

Nevertheless, the present invention is by no means limited to the above exemplary description. Namely, some of, or all of the above noted means and processing apparatus, which are implemented through the process according to the programs executed by CPU 40, may alternatively be structured by hardware.

In addition, there implemented for the control process included in the signal control method are playback process steps 507 and steps 511 in FIG. 8, and recording process steps of 607 and steps of 611 in FIG. 9. Furthermore, the process for acquiring control information is implemented steps 301 to steps 319 in FIG. 5. Still in addition, there implemented for the control process included in the position control method are playback process steps 521 to steps 533 in FIG. 8, and recording process steps 621 to steps 633 of FIG. 9.

In addition, the TE signal control programs disclosed herein are composed of programs corresponding to the flowchart included in FIG. 5, the steps 505 through steps 533 in FIG. 8, and steps 605 through steps 633 in FIG. 9, among the programs loaded in the flash memory 39.

As described earlier, the optical disc system disclosed herein is configured to control the amplitude of track error signals by applying the TE amplitude regulation value, which is extracted from RAM 41 to correspond to the zone including the playback region, in response to a playback request command issued by the host.

The position of the objective lens in the tracking direction can therefore be controlled precisely prior to the playback process of whichever region among those on the optical disc is specified.

As a result, it becomes feasible for an objective lens to be precisely positioned even for the discs of low and sub-standard quality, which have been assumed not eligible for normal error processing. Accordingly, the playback process of the data recorded on optical discs can be implemented with high precision.

In addition, the optical disc system is configured to control the track balance of track error signals by applying the TB regulation value, which is extracted from RAM 41 to correspond to the zone including the playback region, in response to a playback request command issued by the host. The position of objective lens in the tracking direction can therefore be controlled precisely prior to the playback process.

As a result, playback process of the data recorded on optical discs can be implemented with high precision.

Still in addition, the present optical disc system is configured to control the amplitude of track error signals by applying the TE amplitude regulation value, which is extracted from RAM 41 to correspond to the zone including the recording region, in response to a record request command issued by the host. The position of objective lens in the tracking direction can therefore be controlled precisely prior to the recording process whichever region among those on the optical disc is specified.

As a result, it becomes feasible to implement the recording process onto optical discs with high precision.

In addition, the present optical disc system is configured to control the track balance of track error signals by applying the TB regulation value, which is extracted from RAM 41 to correspond to the zone including the record region, in response to a record request command issued by the host. The position of objective lens in the tracking direction can therefore be controlled precisely prior to the recording process.

As a result, it becomes feasible for recording process onto optical discs be implemented with high precision.

Furthermore, TB regulation value and TE amplitude regulation value are computed for each zone and the results are stored in RAM 41, when an optical disc is loaded on the optical disc system according to the embodiment disclosed herein.

Therefore, possible degradation in process efficiency can be alleviated for the playback and record process in the optical disc system.

Although the present embodiment has been described herein above on the assumption that the region for either recording or playing back is included in one single zone, this is not intended to be limiting. The region may alternatively extend over plural zones.

In such case, TB regulation value and TE amplitude regulation value of applicable zones are utilized. Namely, the TB regulation value and TE amplitude regulation value may each differ over the zone boundary from the values for one zone to those for the other.

In addition, although the description has been made on the case where tack error signals are controlled utilizing both TB regulation value and TE amplitude regulation value, this is not intended to be limiting. Track error signals may be controlled by alternatively utilizing either of the two. In such a case, the one that is more effective for the control may be selected.

Although the present embodiment has been described on the assumption that the position control is carried out on the tracks divided into eight zones, this is not intended to be limiting. In addition, although the size of the zones has been assumed in the description, in that the zones relatively close to either the center of rotation or the outer edge of the discs are each set to have width narrower than other medium regions, this is not intended to be limiting either.

Namely, the zones may be formed by dividing tracks so that the track error signals are controlled most efficiently according to the characteristics of the recording surface of loaded optical disc.

In addition, the information regarding the zone division may be furnished by each supplier.

Although the present embodiment has been described adopting the DPP method to suitably detect track-error signals, this is not intended to be limiting but other methods may alternatively be used.

For example, the so-called three-spot method and one-beam method which utilizes return beam from one light spot formed on the surface of optical recording disc may be implemented. The latter is generally known as the push-pull method and phase difference method.

In addition, the description has been made utilizing a photo-module provided with a semiconductor laser 51a and a photo-receptor 59 formed as a package. However, the photo-module may alternatively be formed with a light source and a photo-receptor each provided individually.

Still in addition, the present embodiment has been described adopting the hologram as a unit for diffracting returning beams reflected back from the surface of recording medium. However, this is not intended to be limiting. Other units may alternatively be used such as, for example, a beam splitter and other similar devices.

Furthermore, the present embodiment has been described herein primarily on the case in conformity with ATAPI standards. However, this is not intended to be limiting. Other means may alternatively be used, which are in conformity with ATA (AT Attachment), SCSI (Small Computer System Interface), USB (Universal Serial Bus) 1.0, USB 2.0, IEEE 1394, IEEE 802.3, Serial ATA, or Serial ATAPI.

Although the present embodiments have been described on the assumption that the optical discs are herein assumed to conform to DVD standards, this is not intended to be limiting. Other means may alternatively be used.

For example, the optical disc system may alternatively be one adapted to optical discs in conformity with CD standards.

Furthermore, this may be an optical disc system adapted for a plurality of optical discs each conforming to the standards different from one another.

In this case, the optical disc system may be one adapted to anyone of the optical discs which are tuned to light beams with the wavelength of 405, 650, or 780 nm. That is to say, an optical disc system may suitably be utilized according to the present disclosure as long as this disc system is configured to control the position of objective lens utilizing return beams from the surface of recording medium.

In addition, although the TE signal regulating programs have been stored in the flash memory 39 in the above noted embodiments, these programs may alternatively be stored in other recording media such as, for example, optical CDs, DVDs, magneto-optical discs, memory cards, flexible discs, and other similar storage devices.

In this case, these recording media are each provided with compatible driving units through which the TE signal regulating programs are forwarded to the flash memory 39.

In addition, the TE signal regulating programs may be forwarded to the flash memory 39, alternatively by way of network such as, for example, LAN, intranet, and the internet.

Still in addition, although the present disclosure has been described primarily on the optical disc system capable of implementing record and playback of information data, this is not intended to be limiting. For example, the optical disc system may alternatively be one adapted only to playback.

The process steps set forth in the present description on the apparatus and method of optical recording media may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification also includes a computer-based product which may be hosted on a storage medium, and include instructions which can be used to program a microprocessor to perform a process in accordance with the present disclosure. This storage medium can include, but not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

It is apparent from the above description including the apparatus and method of optical recording media disclosed herein offer several advantages over similar apparatuses and methods previously known such as, for example, acquiring the signals containing information on the accurate position of objective lens in the direction of recording tracks, and controlling the position with a high precision.

These advantages are attained in practice by the optical disc system and computer product and program storage device for the product in use for acquiring the signals disclosed herein above.

Additional modifications and variations of the present invention are possible in light of the above teachings. It is therefore to be understood that within the scope of the appended claims, the invention may be practiced other than as specifically described herein.

What is claimed as new and desired to be secured by Letters Patent of the United States is:

1. A signal regulating method for regulating signals containing information regarding a position of an objective lens in a tracking direction, said tracking direction being perpendicular to a tangential direction with respect to a track formed on an optical recording disc, said method comprising the steps of:

in response to an access request specifying an access target region of said track on said optical recording disc, regulating said signals corresponding to a regulating zone which includes said access target region to be regulated utilizing regulation information previously acquired for said regulating zone, said regulating zone being one zone of a plurality of regulating zones formed by dividing a plurality of said tracks of said disc into radial zones; and performing a tracking control which causes said objective lens to follow said track within said access target region of said track based on said regulation information.

2. The method according to claim 1, wherein said regulation information includes at least one of amplitude information and track balance information for track-error signals.

3. The method according to claim 2, wherein said regulation information includes said amplitude information.

4. The method according to claim 3, further comprising the step of:

acquiring regulation information on each said plurality of regulating zones prior to said step of regulating signals.

5. The method according to claim 4, wherein said step of acquiring regulation information is implemented upon detecting said optical disc being loaded.

6. The method according to claim 2, wherein said regulation information includes said track balance information.

7. The method according to claim 6, further comprising the step of acquiring regulation information on each said plurality of regulating zones prior to said step of regulating signals.

8. The method according to claim 7, wherein said step of acquiring regulation information is implemented upon detecting said optical disc being loaded.

9. The method according to claim 2, wherein said regulation information includes both amplitude information and track balance information.

10. The method according to claim 9, further comprising the step of acquiring regulation information on each said plurality of regulating zones prior to said step of regulating signals.

11. The method according to claim 10, wherein said step of acquiring regulation information is implemented upon detecting said optical disc being loaded.

12. The method according to claim 1, further comprising the step of acquiring regulation information on each said plurality of regulating zones prior to said step of regulating signals.

13. The method according to claim 12, wherein said step of acquiring regulation information is implemented upon detecting said optical disc being loaded.

14. A computer readable medium containing a program for use with a control computer in an optical disk system configured to access to an optical recording disc, said optical recording disc being provided thereon with a track, said computer program when executed by said control computer causing said control computer to operate said optical disk system to perform the steps of:

acquiring a target region of said track for said access in response to an access request;

regulating signals containing information regarding a position of an objective lens in a direction perpendicular to a tangential direction with respect to a track, said signals corresponding to a regulating zone including said target region to be regulated utilizing regulation information previously acciuired for said regulating zone, said regulating zone being one of a plurality of regulating zones formed by dividing a plurality of said tracks of said disc into radial zones; and performing a tracking control which causes said objective lens to follow along said track within said target region based on said regulation infornmtion.

15. The computer readable medium according to claim 14, wherein said regulation information includes at least one of amplitude information and track balance information for track-error signals.

16. The computer readable medium according to claim 15, wherein said regulation information includes said amplitude information.

17. The computer readable medium according to claim 16, wherein said computer program causes said control computer to operate said optical disk system to further perform the step of:
   acquiring regulation information on each said plurality of regulating zones prior to said step of regulating signals.

18. The computer readable medium according to claim 15, wherein said regulation information includes said track balance information.

19. The computer readable medium according to claim 18, wherein said computer program causes said control computer to operate said optical disk system to further perform a step of:
   acquiring regulation information on each said plurality of regulating zones prior to said step of regulating signals recording or reproduction operation.

20. The computer readable medium according to claim 15, wherein said regulation information includes both amplitude information and track balance information.

21. The computer readable medium according to claim 20, wherein said computer program causes said control computer to operate said optical disk system to further perform a step of:
   acquiring regulation information on each said plurality of regulating zones prior to said step of regulating signals.

22. The computer readable medium according to claim 15, wherein said computer program causes said control computer to operate said optical disk system to further perform a step of:
   acquiring regulation information on each said plurality of regulating zones prior to said step of regulating signals.

23. The computer readable medium according to claim 14, wherein said computer program causes said control computer to operate said optical disk system to further perform a step of:
   acquiring regulation information on each said plurality of regulating zones prior to said step of regulating signals.

24. A program storage device readable by a machine, tangibly embodying a program of instructions when executed by the machine causing the machine to perform the steps of:
   acquiring a target region for access in response to an access request of an optical recording disc;
   regulating signals containing information regarding a position of an objective lens in a direction perpendicular to a tangential direction with respect to a track, said signals corresponding to a regulating zone including said target region of said track to be regulated utilizing regulation information previously acquired for said regulating zone, said regulating zone being one of a plurality of regulating zones formed by dividing a plurality of said tracks of said disc into radial zones; and
   performing a tracking control that causes said objective lens to follow along said track within said access target region based on said regulation information.

25. An optical disc system configured to access an optical recording disc, said optical recording disc being provided thereon with a track, said optical disc system, comprising:
   a regulating unit for acquiring information regarding a position of an objective lens in a direction perpendicular to a tangential direction with respect to said track, said regulating zone including an access target region of said track to be regulated utilizing regulation information previously acquired for said regulating zone, said regulating zone being one of a plurality of regulating zones formed by dividing a plurality of said tracks of said optical recording disc into radial zones;
   an optical pickup unit configured to illuminate light beams onto a recording surface of said recording disc and to receive further light beams reflected back from said recording surface;
   a process unit configured to perform said access utilizing signals output from said optical pickup unit; and
   a servo control unit configured to perform a tracking control that causes said objective lens to follow along said track within said access target region based on said regulation information.

26. The optical disc system according to claim 25, wherein said regulating unit includes an amplitude regulating unit for regulating amplitude of track-error signals.

27. The optical disc system according to claim 26, wherein said regulating unit includes a track balance regulating unit for regulating track balance of track-error signals.

28. The optical disc system according to claim 27, further comprising a regulation information acquisition unit for acquiring regulation information on each said plurality of regulating zones.

29. The optical disc system according to claim 28, further comprising:
   a memory for storing said regulation information; and
   a storage unit for storing said regulation information in said memory.

30. The optical disc system according to claim 25, wherein said regulating unit includes a track balance regulating unit for regulating track balance of track-error signals.

31. The optical disc system according to claim 30, further comprising a regulation information acquisition unit for acquiring regulation information on each said plurality of regulating zones.

32. The optical disc system according to claim 31, further comprising:
   a memory for storing said regulation information; and
   a storage unit for storing said regulation information in said memory.

33. The optical disc system according to claim 25, further comprising a regulation information acquisition unit for acquiring regulation information on each said plurality of regulating zones.

34. The optical disc system according to claim 33, further comprising:
   a memory for storing said regulation information; and
   a storage unit for storing said regulation information in said memory.

35. The optical disc system according to claim 25, further comprising:
   a memory for storing said regulation information; and
   a storage unit for storing said regulation information in said memory.

36. The method according to claim 1, wherein said signals and regulation information correspond to a track pitch of said track within said regulating zone.

37. The computer program product according to claim 14, wherein said signals and regulation information correspond to a track pitch information for said track within said regulating zone.

38. The program storage device according to claim 24, wherein said signals and regulation information correspond to a track pitch information for said track within said regulating zone.

39. The optical disc system according to claim 25, wherein said signals and regulation information correspond to a track pitch information for said track within said regulating zone.

* * * * *